Figure 1:
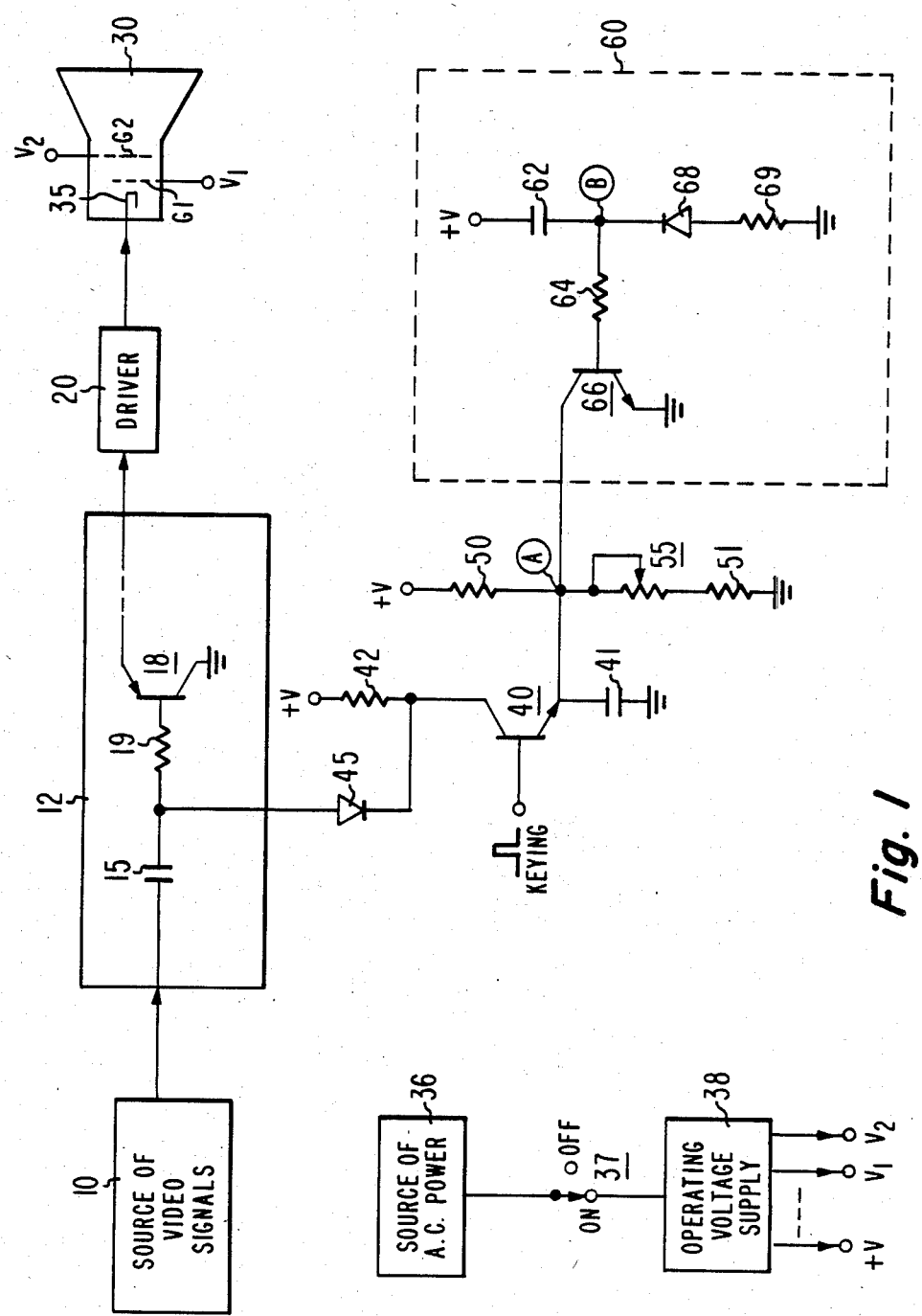

United States Patent [19]

Lee

[11] Patent Number: 4,631,591
[45] Date of Patent: Dec. 23, 1986

[54] KINESCOPE WITH COMPENSATED CONDUCTION CHARACTERISTIC

[75] Inventor: Wayne Lee, Taipei, Taiwan

[73] Assignee: RCA Corporation, Princeton, N.J.

[21] Appl. No.: 699,556

[22] Filed: Feb. 8, 1985

[51] Int. Cl.[4] .............................................. H04N 5/63
[52] U.S. Cl. ................................... 358/190; 358/243; 315/411; 315/383
[58] Field of Search ............... 358/190, 168, 74, 243; 315/411, 408, 383

[56] References Cited

U.S. PATENT DOCUMENTS

| 3,908,159 | 9/1975 | Griffey | 358/190 X |
| 3,924,067 | 12/1975 | Arneson | 358/243 |
| 4,129,885 | 12/1978 | Chovanec | 358/190 |
| 4,494,048 | 1/1985 | Van Den Driessche | 315/411 X |
| 4,546,388 | 10/1985 | Williams, Jr. | 358/243 X |

Primary Examiner—James J. Groody
Assistant Examiner—E. Anne Toth
Attorney, Agent, or Firm—P. J. Rasmussen; P. M. Emanuel; R. H. Kurdyla

[57] ABSTRACT

A video monitor includes an image displaying kinescope which exhibits a temperature dependent conduction characteristic that results in declining light output and image brightness during an initial warm-up period, from a time soon after the system is initially energized to a time several minutes later when steady-state operation is reached. To counteract the declining kinescope light output during the warm-up interval, a compensation circuit having a time constant characteristic which approximates the kinescope conduction characteristic during the warm-up interval causes the kinescope to exhibit increasing light output and image brightness during the warm-up interval. Thus substantially uniform light output is produced over the warm-up interval.

8 Claims, 5 Drawing Figures

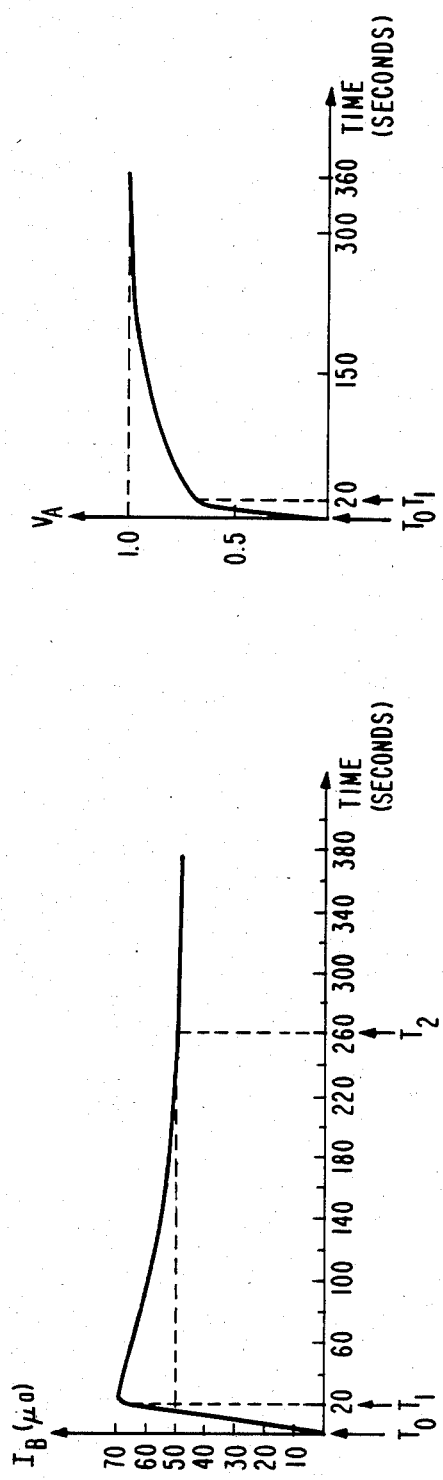
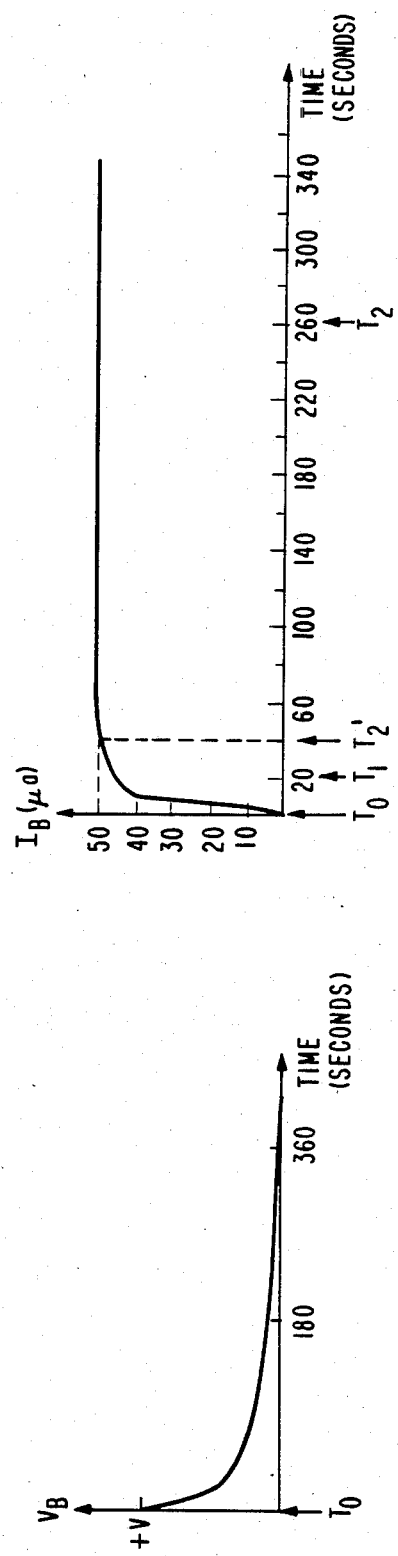

KINESCOPE WITH COMPENSATED CONDUCTION CHARACTERISTIC

This invention concerns apparatus in a video signal processing system for modifying the conduction characteristic of an image displaying kinescope during an initial warm-up interval.

Some types of kinescopes exhibit a conduction characteristic during an initial warm-up interval such that current conduction and light output steadily decline from an initial level to a lower level over several minutes of the warm-up interval, until a steady state operating condition is reached. A system employing a kinescope of this type will exhibit one image brightness level soon after the kinescope is energized, and a significantly lower brightness level several minutes later when the steady-state operating condition is reached, due to temperature related drift during the warm-up interval.

One type of kinescope which exhibits the characteristic mentioned above is the Model M31-334 GH kinescope manufactured by Philips Taiwan Ltd. of Taiwan. In one system using this kinescope it was observed that the initial kinescope beam current conduction was approximatley 40% greater than the steady-state beam current level about 4 to 5 minutes after the kinescope was initially energized.

It is herein recognized that such a significant decrease in the kinescope light output and image brightness between a time soon after the kinescope is energized and a time several minutes later when the steady-state condition is reached, is disturbing to a viewer particularly when the kinescope is employed as a monitor for data display purposes. The described brightness drift to a lower level can be readily detected in a data display monitor where the overall information-related brightness level usually changes very little if at all. Brightness drift is particularly noticeable in the case of an inverse character display, where the background brightness level dominates the character display and is the primary determinant of the light output.

Accordingly, there is disclosed herein a video signal processing system with an image display device of the type which exhibits a gradually decreasing light output characteristic over a warm-up interval between a time soon after the system is initially energized and a later time when a steady-state condition is achieved. In accordance with the principles of the present invention a circuit, e.g., a time constant circuit, coupled to the display device compensates for the decreasing light output of the display device over the warm-up interval. The operating characteristic of the compensation circuit complements the operating characteristic of the display device so that soon after the display device is energized it produces a light output which closely approximates the normally expected steady-state light output.

In the drawing:

FIG. 1 shows a portion of a video monitor including a compensation network according to the present invention; and FIGS. 2-5 depict response characteristics helpful in understanding the operation of the system in FIG. 1.

In FIG. 1, the video monitor system includes a source 10 of video signals, such as alphanumeric data signals from a computer, which are applied to a video signal processing network 12. Network 12 is shown as including an AC coupling capacitor 15 which conveys video signals to the base input of a PNP amplifier transistor 18 via a resistor 19. Not shown but also included within network 12 are additional amplifying, level shifting and coupling circuits for processing the video signal in a manner to provide a suitable low level video signal for application to a kinescope driver stage 20. Driver 20 includes an amplifier for providing a high level amplified video output signal capable of driving a cathode intensity control electrode 35 of a monochrome image displaying kinescope 30. Associated with the electron gun assembly of kinescope 30 are cathode 35, a control grid G1 and a screen grid G2.

Video signals are DC coupled to kinescope 30 via resistor 19, transistor 18 and driver stage 20. The DC component of the video signal is restored by means of a keyed clamping circuit including a keyed transistor 40, a charge storage capacitor 41, a resistor 42, and a clamp diode 45 coupled from the collector output of transistor 40 to the junction of capacitor 15 and resistor 19 in the video signal path. Transistor 40 is keyed to conduct periodically during the so-called "back porch" interval of each horizontal line blanking interval in response to a positive KEYING signal applied to its base electrode. The KEYING signal is derived from horizontal deflection circuits of the system (not shown). When conductive, transistor 40 causes the junction of capacitor 15 and resistor 19 to be clamped to a DC level which is related to the emitter voltage of transistor 40.

The emitter voltage of transistor 40 is a variable brightness control voltage derived from a node A in a brightness control network having a variable voltage divider comprising resistors 50 and 51 and an adjustable brightness control resistor 55 coupled in series between a source of positive DC potential (+V, e.g., +12 volts) and ground potential. Adjustment of resistor 55 varies a brightness representative voltage $V_A$ developed at node A, and the level of conduction of transistor 40. Thus adjustment of resistor 55 varies the DC clamping voltage produced at the junction of capacitor 15 and resistor 19, to thereby vary the DC-related brightness of an image displayed by kinescope 30. That is, the current conducted by kinescope 30 and its associated light output are related to the setting of brightness control resistor 55. An increasingly positive brightness control voltage $V_A$ at node A produces a related increase in the light output of kinescope 30 and in the brightness of a displayed image.

The system is energized in response to system operating voltages provided by an operating voltage supply 38 when supply 38 is energized from a source of AC power 36 when a viewer operated power switch 37 is placed in the "ON" position. The operating voltages from supply 38 include operating voltages for the signal processing stages of the system, e.g., voltage +V, as well as operating voltages for kinescope 30 such as grid bias voltages $V_1$ and $V_2$ in addition to filament heater and very high anode voltages.

A compensation circuit 60 in accordance with the principles of the present invention serves to modify the brightness control voltage developed at node A in order to compensate for the conduction characteristics of kinescope 30 during an initial warm-up interval.

In this embodiment kinescope 30 is the model M31-334 GH kinescope manufactured by Philips Taiwan Ltd. This particular type of kinescope exhibits the current conduction characteristic shown in FIG. 2 between a time $T_0$ when the system is initially energized, and a later time $T_2$ more than four minutes later when the steady-state operating condition is reached at the end of the warm-up interval. As seen from FIG. 2, the beam (cathode) current $I_B$ conducted by kinescope 30 initially rises relatively quickly to a first level at a time $T_1$, then gradually decreases exponentially to a lower level representative of lower light output and image brightness at steady-state time $T_2$ about four minutes later. This initial response is considered to be objectionable to a viewer because it requires the viewer to make one or more compensating brightness adjustments between times $T_1$ and $T_2$, in addition to an initial brightness adjustment which would normally be made shortly after the system is energized.

The described initial response of kinescope 30 is due to temperature related drift of the kinescope conduction characteristics, as determined by the structure and materials of the kinescope electron gun assembly including the cathode and the G1 and G2 grid electrodes. More specifically, the glass support structure for the metallic electron gun elements exhibits a high temperature characteristic such that the very high temperatures can be tolerated without deformation of the glass support structure. On the other hand, the metallic gun elements exhibit a different high temperature characteristic and are subject to slight deformation as the operating temperature increases over the warm-up interval. The cathode structure experiences the highest operating temperature increase compared to the G1 and G2 grid structures.

The increasing temperature during the warm-up interval prior to time $T_2$ causes the cathode, G1 and G2 structures to deform slightly by different amounts. The most signficant deformation with respect to the effect on the kinescope conduction characteristics is that which causes the spacing between the cathode and G1 grid structures to increase during the warm-up interval. This increase in spacing alters the beam current conduction characteristic so as to produce less beam current, resulting in reduced light output and image brightness.

Circuit 60 compensates for the undesirably long and continually decreasing kinescope light output and brightness characteristic between times $T_1$ and $T_2$ during the warm-up interval. Circuit 60 includes a time constant network with a capacitor 62 and a resistor 64 coupled as shown to a source of positive DC voltage (+V, from supply 38) and to the base input of a transistor 66. Capacitor 62 and resistor 64 exhibit a time constant of approximately 128 seconds in this example. The collector output of transistor 66 is coupled to node A for modifying the brightness control voltage at node A in accordance with the time constant established by resistor 64 and capacitor 62.

FIG. 3 illustrates the response of a voltage $V_B$ at a node B in the base circuit of transistor 66. The collector current of transistor 66 exhibits a similar response. FIG. 4 depicts the response of voltage $V_A$ at node A in the emitter circuit of transistor 40. The voltage responses at both node A and node B are determined by the time constant established by capacitor 62 and resistor 64.

Referring to FIG. 3, when the system is initially energized and voltage +V is initially applied to capacitor 62 at time $T_0$, voltage $V_B$ at node B exhibits a maximum positive value of +V and thereafter decays exponentially as capacitor 62 charges. Thus transistor 66 is caused to conduct heavily in response to the maximum initial base voltage ($V_B$) at time $T_0$, and thereafter exhibits exponentially decreasing collector current during the warm-up interval in accordance with the response in FIG. 3.

The exponentially decreasing collector current of transistor 66 modifies voltage $V_A$ at node A and thereby the brightness control emitter voltage of transistor 40, by modifying the charge on capacitor 41 during the kinescope warm-up interval in accordance with the response shown in FIG. 4. From FIG. 4 it is seen that voltage $V_A$ is at a minimum value at time $T_0$, when transistor 66 is initially caused to conduct heavily to discharge capacitor 41. Afterwards, during the remainder of the warm-up interval, transistor 66 conducts increasingly less current whereby voltage $V_A$ exhibits an increasily more positive value during the warm-up interval.

The exponential response of voltage $V_A$ shown in FIG. 4 closely approximates the exponential current conduction response of the kinescope during the warm-up interval, except that the respective responses are oppositely directed. That is, the exponential response of voltage $V_A$ acts to increase the kinescope light output and image brightness during the warm-up interval, particularly from times $T_1$ to $T_2$, to compensate for the similarly exponential response of the kinescope from times $T_1$ to $T_2$ associated with declining light output and image brightness.

The kinescope conduction characteristic in response to voltage $V_A$ is shown in FIG. 5. As shown, kinescope beam current $I_B$ reaches a stable steady-state operating condition in a much shorter time of less than one minute, i.e., from time $T_0$ to $T_2'$, compared to the original kinescope warm-up interval shown in FIG. 2. Thus compensation circuit 60 advantageously serves to eliminate the long-term brightness drift over the warm-up interval.

When the system is de-energized, capacitor 62 is discharged by means of a diode 68 and a resistor 69. A discharge time constant of approximately 128 seconds was found to allow the compensation circuit to perform as described when the system was re-energized after having power removed for shorter than normal intervals of 30 seconds to 3 minutes.

The same concept of compensation provided by time constant network 60 coupled to the video signal path as shown and described, can also be advantageously used in a system employing a kinescope which exhibits gradually increasing light output during the warm-up interval. In such case a PNP device would be used for transistor 66.

The conduction response for a given kinescope type is reasonably predictable from one unit to another. Compensation of the conduction response within five to ten percent is satisfactory and is readily achievable by the described compensation circuit.

What is claimed is:

1. A video signal processing and display system comprising:

means for energizing said system;

a source of video signals containing information to be displayed;

an image display device coupled to said energizing means and responsive to said video signals, said display device having an inherent initial conduction characteristic resulting in declining light output during an initial warm-up interval from a time soon after the system is initially energized to a later time when stable steady-state operation is achieved;

a compensation circuit coupled to said energizing means and having a conduction characteristic which approximates the conduction characteristic of said display device during said warm-up interval; and means for coupling said compensation circuit to said display device to counteract said initial conduction characteristic of said display device so that said display device exhibits substantially uniform conduction and light output during said warm-up interval.

2. A system according to claim 1, wherein said compensation circuit includes a time constant network with a time constant approximating the conduction time constant of said display device during said warm-up interval.

3. A system according to claim 1, wherein said compensation circuit is coupled to said source of video signals for modifying the DC component of signals coupled from said source to said display device, to bias said display device for increased current conduction during said warm-up interval.

4. A system according to claim 1, wherein an image brightness control network provides a brightness control voltage to said source of video signals; and said compensation circuit modifies said brightness control voltage.

5. A system according to claim 1, wherein said compensation circuit comprises a controllable current conducting device with an input electrode, and an output electrode coupled to said source of video signals;

an operating voltage supply for providing system operating voltages when said system is initially energized; and a time constant network coupled to said input of said current conducting device and to an operating voltage output of said voltage supply.

6. A system according to claim 5, wherein said time constant network comprises a resistor and a capacitor coupled in series between said voltage supply output and said input electrode of said current conducting device.

7. A video signal processing and display system comprising:

means for energizing said system;

a source of video signals containing information to be displayed;

an image display device coupled to said energizing means and responsive to said video signals, said display device having an inherent initial conduction characteristic resulting in gradually changing light output during an initial warm-up interval from a time soon after the system is initially energized to a later time when stable steady-state operation is achieved;

a time constant circuit coupled to said energizing means and having a continuous conduction characteristic which approximates the conduction characteristic of said display device during said warm-up interval; and means for coupling said time constant circuit to said display device for gradually modifying said initial conduction characteristic of said display device, to counteract said initial conduction characteristic so that said display device exhibits substantially uniform conduction and light output during said warm-up interval.

8. A system according to claim 7, wherein said time constant network is coupled to said source of video signals for modifying the DC component of signals coupled from said source to said display device, to thereby modify the bias of said display device during said warm-up interval.

* * * * *